United States Patent
Lyons et al.

[11] Patent Number: 6,061,399
[45] Date of Patent: May 9, 2000

[54] METHOD AND APPARATUS FOR INFORMATION STREAM FRAME SYNCHRONIZATION

[75] Inventors: Paul Wallace Lyons, New Egypt; John Prickett Beltz, Willingboro, both of N.J.; Alfonse Anthony Acampora, Staten Island, N.Y.

[73] Assignee: Sarnoff Corporation, Princeton, N.J.

[21] Appl. No.: 08/864,325

[22] Filed: May 28, 1997

[51] Int. Cl.[7] .................................................. H04N 7/24
[52] U.S. Cl. .................................... 375/240; 348/845
[58] Field of Search ................................. 348/384, 390, 348/423, 845, 845.2; 375/240

[56] References Cited

U.S. PATENT DOCUMENTS

| | | | |
|---|---|---|---|
| 5,720,037 | 2/1998 | Biliris | 348/6 |
| 5,751,888 | 5/1998 | Fukuchi | 386/68 |

*Primary Examiner*—Bryan Tung
*Attorney, Agent, or Firm*—William J. Burke

[57] ABSTRACT

A timing synchronization method and apparatus for processing a compressed information stream comprising a plurality of information segments representative of a sequence of information frames. Information segments representative of information frames are deleted in response to an indicium of buffer overutilization.

18 Claims, 4 Drawing Sheets

METHOD AND APPARATUS FOR INFORMATION STREAM FRAME SYNCHRONIZATION

This invention was made with U.S. government support under contract number 70NANB5H1174. The U.S. Government has certain rights in this invention.

This application is related to U.S. patent application Ser. No. 08/864,326, filed May 28, 1997.

The invention relates to communication systems in general and, more particularly, the invention relates to frame synchronization of an information stream.

BACKGROUND OF THE DISCLOSURE

Synchronization of a decoding and presentation process for received bitstreams is a particularly important aspect of real-time digital data communication and delivery systems. Because received data is expected to be processed at a particular rate (to match the rate at which it is generated and transmitted), loss of synchronization leads to either buffer overflow or underflow at the decoder, and as a consequence, loss of presentation and/or displaced synchronization.

In several communications systems the data to be transmitted is compressed so that the available bandwidth is used more efficiently. For example, the Moving Pictures Experts Group (MPEG) has promulgated several standards relating to digital data delivery systems. The first, known as MPEG-1 refers to ISO/IEC standards 11172 and is incorporated herein by reference. The second, known as MPEG-2, refers to ISO/IEC standards 13818 and is incorporated herein by reference.

MPEG-compliant systems are being used to generate and store complete presentations containing video, audio and ancillary data. Since the amount of data generated for each picture is variable (based on the picture coding approach and complexity), timing cannot be derived directly from the start of picture data. Therefore, timing signals that are crucial to the proper display of the presentation are embedded in the MPEG information stream at the time of generation or storage. These timing signals are used to accurately display the information at the receive side of an MPEG-compliant system.

Current analog television studio practice is to synchronize incoming signals to the studio reference timing. This is accomplished through the use of frame synchronizers, which add or delete frames based upon the differences in the timing references at the signal source and destination. Analog television system frame synchronizers utilize synchronizing pulses included in the analog television signal. These sync pulses delineate horizontal lines, picture fields and picture frames.

Since an MPEG-compliant information stream does not include analog television type sync pulses, frame synchronization of such a stream presents a uniquely different problem. For example, an MPEG-compliant transmitter station encodes a program and transmits the encoded program as a television signal which is referenced to a local (i.e., transmitter) oscillator, such as a 27 MHz station clock. A receiver station having its own local oscillator receives and decodes the television signal. The receiver must synchronize the received signal to the local timing reference. One method is to synchronize the send and receive clocks. This is costly and disadvantageously requires that one of the stations (i.e., transmit or receive) relinquish control of the station clock to the other station or to a reference outside of the station.

Therefore, a need exists in the art for a cost-efficient method and apparatus for synchronizing video and other compressed information frames included within a compressed information stream such as an MPEG-compliant information stream. Is also seen to be desirable to provide a frame synchronizing method and apparatus in which local control of timing references is retained while providing the necessary frame synchronization between the frame rate of the transmitter station and the frame rate of the receive station.

SUMMARY OF THE INVENTION

The disadvantages heretofore associated with the prior art are overcome by the present invention of a timing synchronization method and apparatus suitable for adapting an asynchronous compressed information stream to a timing reference that adds or drops information frames in response to one or more indicia of buffer utilization. A first information stream comprises timing information related to a first timing reference, and a sequence of compressed information frames that have been encoded according to the first timing reference. A second information stream is formed by decoding the compressed information frames using timing information included in the first information stream. The second information stream is generally synchronized to a second timing reference by adding or deleting information frames. Thus, an adjustment may be made to compensate for timing differences between the first and second timing references. Various alignments may also be desirable prior to coupling the second information stream to an output. For example, it is desirable to delete only those information frames which are not critical to the ultimate quality of the information delivered by the information stream.

An MPEG synchronizer selectively adds or drops MPEG frames or access units in response to control signals received from a timing unit or in response to indicia of an overflow or underflow condition in an input buffer within the frame synchronizer. The frame synchronizer may also perform frame-alignment and video buffer verifier (VBV) alignment of an input stream prior to the selection of that stream by a mulitplexer.

A timing offset between a transmit system clock and a receive system clock is determined by: 1) noting an increase or decrease in the number of frames stored in the combined VBV buffer and the receive system input buffer; or 2) noting a difference in the PCR offset, the difference between local PCR and received PCR, when receiving transport streams.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The invention will be described within the context of a video frame synchronizer which is operative upon an MPEG information stream within an information processing system. An audio or ancillary data frame synchronizer may also be constructed according to the invention. It must also be noted that the embodiment of the invention described herein may be modified for use in other compressed data systems where, e.g., an asynchronous compressed information stream including segmented data must be synchronized to a timing reference.

Figure 1:
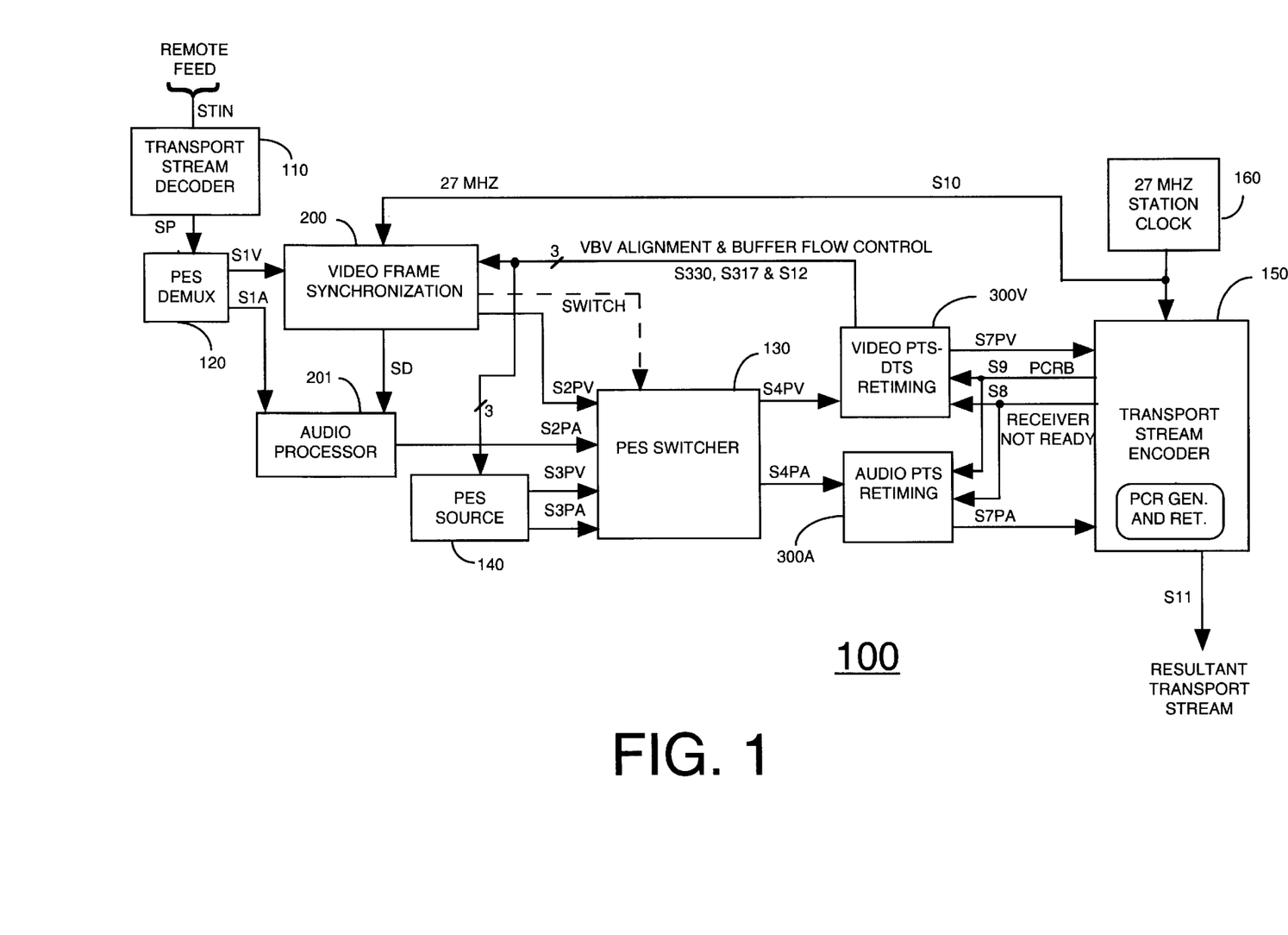
FIG. 1 shows a block diagram of an information processing system including a frame synchronizer according to the invention.

FIG. 1 shows a block diagram of an information processing system 100. A transport stream decoder 110 decodes an input transport stream STIN that is asynchronous to the 27 Mhz studio reference (station clock), illustratively a remote feed, to produce a program stream SP. The program stream SP comprises a plurality of packetized elementary streams (PES). A PES demultiplexer 120 demultiplexes the program stream SP to produce either a plurality of elementary PES streams or transport packetized PES streams including an audio stream S1A and a video stream S1V. Those skilled in the art will recognize that PES streams are embedded within the transport packet structure, therefore the following descriptions will deal only with PES streams. The PES streams S1A, S1V include timing information such as presentation time stamps (PTS) and decode time stamps (DTS) that are asynchronous with respect to a 27 MHz station clock S10. The video and audio PES streams S1V, S1A are coupled to, respectively, video frame synchronizer 200 and audio processor 201.

The video frame synchronizer 200 will be described more fully below with respect to FIG. 2. Briefly, the video frame synchronizer 200 operates to ensure that the received system data rate is adjusted to match the local output data rate. The frame synchronizer monitors a buffer flow control signal S12 that is indicative of buffer utilization in down stream system components and, in response increases or decreases the data rate of the Video Frame Synchronizer 200 output stream S2PV to maintain an appropriate level of buffer utilization. A decision to add or drop frames is based upon a change in the number of frames in the receiver circuitry over time. The decision to add or delete video frames is coupled to audio processor 201 so that appropriate audio frames may be correspondingly added or deleted. The video frame synchronizer 200 and audio processor 201 produce respective frame-synchronized video S2PV and audio S2PA packetized elementary streams (PES) which are coupled to a PES switcher 130. In addition to the buffer management function, the video frame synchronizer aligns the video frames of a stream prior to selection of that stream by the PES switcher, such that the first two frames provided by the video frame synchronizer will be anchor frames, such as an I-frame and a P-frame.

PES switcher 130 also receives a second pair of video S3PV and audio S3PA packetized elementary streams from a PES source 140 (e.g., a digital video disk player, tape player, camera, server and the like). The PES source 140 monitors the buffer flow control signal S12 that is indicative of buffer utilization in downstream system components and, in response, increases or decreases the data rate of the PES source 140 output streams S3PV, S3PA to maintain an appropriate level of buffer utilization.

In response to a control signal (not shown) the PES switcher 130 selects and couples one pair of video and audio packetized elementary streams S4PV, S4PA to respective video and audio retiming units 300V, 300A. The video retiming unit 300V will be described more fully below with respect to FIG. 3. Briefly, the video retiming unit 300V decodes and retimes the old presentation time stamps (PTS) and decode time stamps (DTS) of the video stream using new timing information derived from a Program Clock Reference Base (PCRB) signal S9. Audio retiming unit 300A retimes the old PTS of the audio stream using new timing information derived from a Program Clock Reference Base (PCRB) signal S9. The video and audio retiming units 300V, 300A produce, respectively, a retimed video stream S7PV and a retimed audio stream S7PA. In addition, the video retiming unit 300V generates a number of control signals. The buffer flow control signal S12 is used to regulate data production in the video frame synchronizer 200 and the PES source 140. The buffer flow control signal S12 is depicted in FIG. 1 as being generated by the video PTS-DTS retiming unit 300V. In response to the flag, the number of bits is, respectively, increased or decreased. During an initialization process in the Video PTS-DTS Retiming circuit, the VBV delay of the VBV buffer is aligned to the VBV delay of the incoming stream. A signal S330, originating in Video PTS-DTS Retiming circuit, indicates the VBV delay of the incoming stream is equal to the VBV delay of the VBV buffer at the end of the alignment process. The number of frames in the combined VBV buffer and the input FIFO of the Video Frame Synchronizer is stored for use in determining the need to add or drop frames. Alternately, when transport streams are being received, the PCR offset (the difference between the incoming PCR and the local PCR) can be used to determine the need to add or drop frames. The audio retiming unit 300A does not include buffer flow management functions but otherwise operates in substantially the same manner as the video retiming unit 300V and, therefore will not be discussed further.

Apparatus suitable for use as the video and audio retiming units 300V, 300A is described below with respect to FIG. 3, and in U.S. patent application Ser. No. 08/864,326, filed May 28, 1997 and incorporated herein by reference.

A transport stream encoder (TSE) 150 receives the retimed video S7PV and audio S7PA PES streams and encodes these streams to produce an output transport stream S11. TSE 150 includes a PCR generator and retimer which receives a 27 MHz station clock signal S10 and performs PCR stamping of the output transport stream S11. The PCR generator also produces the synchronized PCR base reference signal S9 at a 90 Khz rate (the station clock of 27 MHz divided by 300). The PCRB reference signal S9 is fed back to the retiming units 300V, 300A for use in the PTS and DTS stamping process.

The above-described information processing system 100 may be used in a digital communication system, such as the system described in the Advanced Television Systems Committee (ATSC) digital television standard document A/53, incorporated herein by reference. In such a system it is often desirable to switch from a first (i.e., the currently-selected) video and/or audio source to a second (i.e., the next-selected) video and/or audio source in a smooth or "seamless" manner (i.e., minimal undesirable visual or aural artifacts).

To ensure a smooth switching between MPEG streams the inventors have found the following processing operations to be desirable. First, the next-selected stream should be subjected to a frame alignment process prior to switching. The frame alignment process ensures that the first frame of the next-selected stream that is coupled to the output is a non-predicted frame, i.e., an intraframe or "I-frame." The second frame should be another I-frame or a frame predicted using only the first frame, i.e., a forward predicted or "P-frame." When an I-frame is not followed by another I-frame or a frame predicted using only the first frame, i.e., a forward predicted or "P-frame," a specially coded P frame can be added between the previously existing I-frame and B-frame series. This artificially inserts an entry point into the stream during the alignment process. The frame alignment process is performed by the frame synchronizer 200. Second, the VBV delay alignment is performed by the PTS-DTS retiming unit 300V. Alignment results are indicated on signal S330 of FIG. 1. Third, the VBV delays and the utilization of buffer memory (e.g., far-end decoder input buffer or FIFO 220) should be monitored before and after switching. After S330 indicates VBV delay alignment, an increase or decrease in the number of frames stored in the combined VBV-buffer and the input FIFO in the frame synchronizer 200 determines the need to add or drop frames.

Figure 2:
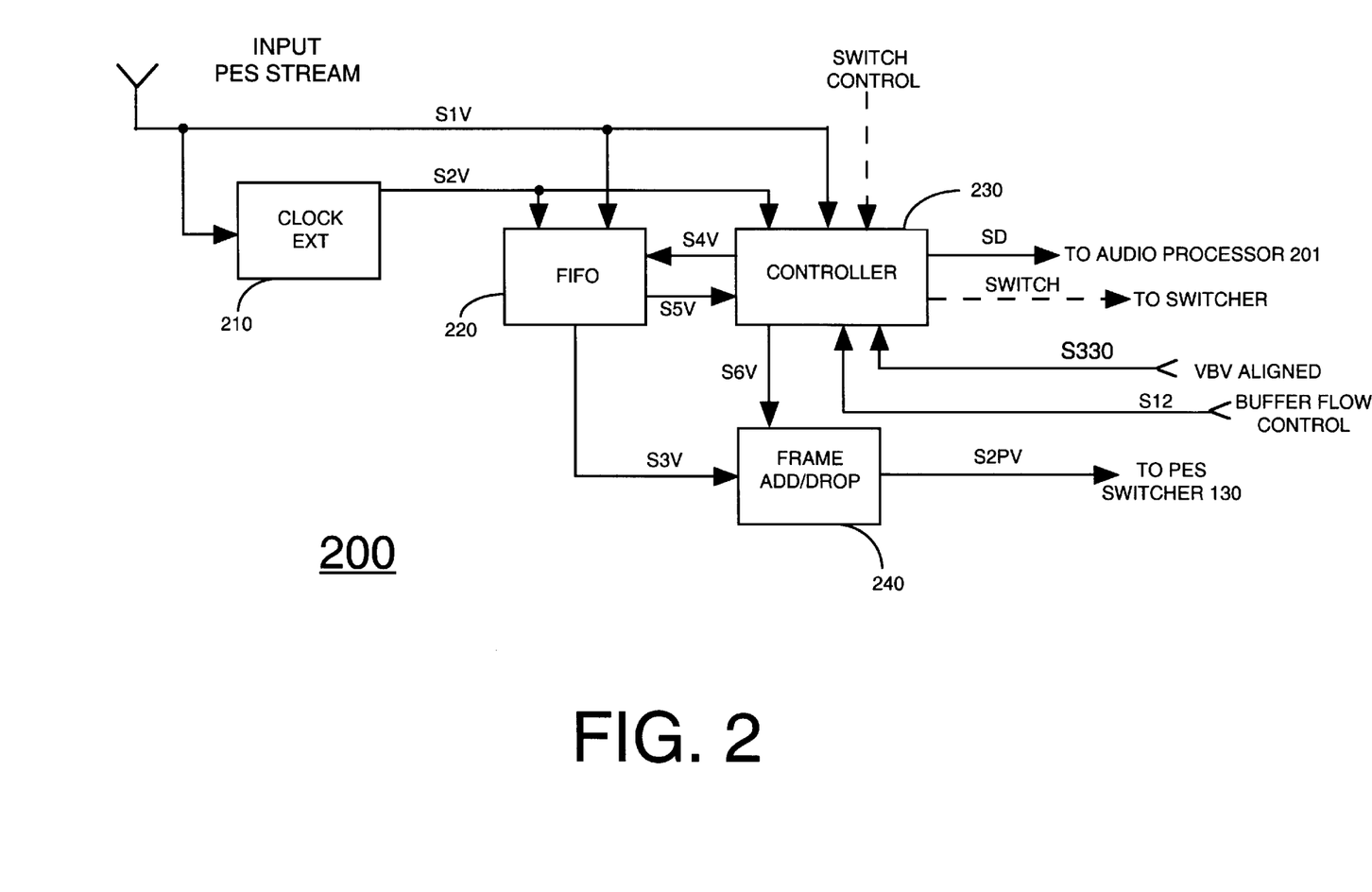
FIG. 2 shows a block diagram of a frame synchronizer according to the invention and suitable for use in the information processing system of FIG. 1.

FIG. 2 shows a block diagram of a frame synchronizer according to the invention and suitable for use in the information processing system of FIG. 1. The frame synchronizer 200 receives a packetized elementary stream (PES) stream S1V, illustratively a video stream, aligns the received PES stream in a first operating mode (i.e., a "pre-select" mode) and couples the PES stream to an output in a second operating mode (i.e., a "selected" or "steady-state" mode). In addition, the frame synchronizer performs various buffer management operations during the second operating mode. The controller 230 is optionally forced into the pre-select or selected modes of operation by a signal SWITCH CONTROL. Moreover, the controller optionally transmits a signal SWITCH to cause a switching operation to take place by, e.g., a "down stream" switcher (e.g., PES switcher 130).

The input video PES stream S1V is coupled to a clock extractor 210, a first-in first out (FIFO) memory 220 and a controller 230. FIFO 220 is ideally large enough to hold an I-frame plus all subsequent frames up to and including the next I-frame. The video stream S1V is clocked into FIFO 220 using a load clock S2V associated with the arriving data. A FIFO output stream S3V representing the temporarily stored input video stream S1V is coupled to an frame add/drop unit 240. Add/drop unit 240 produces an output video stream S2PV comprising the FIFO output stream S3V (pass-through mode), the FIFO output stream S3V with additional frames added (frame add mode) or FIFO output stream S3V with frames deleted (frame drop mode). The mode of operation of add/drop unit 240 is controlled by a signal S6V from the controller 230. The controller 230 also monitors FIFO 220 via a monitor signal S5V and controls FIFO 220 via a control signal S4V. The controller receives a buffer flow control signal S12 that is indicative of buffer utilization in down stream system components. The controller causes the add/drop unit 240 to add or delete video frames, thereby maintaining timing synchronization of the remote and local sources.

The controller 230 monitors the input video stream S1V and the FIFO 220. The controller also controls the operation of the FIFO 220 by, e.g., causing the FIFO to discard all or portions of the stored input video stream S1V. For illustrative purposes it is assumed that each PES packet contains one video access unit (i.e., video frame). Before this video stream can be switched (e.g., by PES switcher 130) to become the output stream, an alignment for switching purposes must be made. Since the MPEG Sequence Header contains information vital to decoding the pictures, a switch into a stream must occur just prior to the sequence header. The last sequence header that has entered the FIFO is stored for use when a sequence header does not immediately precede an I-frame. The FIFO is therefore flushed of all data until an I-frame sits at the output of the FIFO.

The bitstream is constrained such that I-frames are followed by P-frames or I-frames in transmission order to insure replacement of both anchor frames at switch points. When I-frames are followed by B frames, a P frame, comprised of uncoded macroblocks with zero motion vectors, may be optionally inserted between the I-frame and the B-frames. This P-frame will act as a repeat last frame command. The visual effect of the repeat frame on video quality is masked by the scene change that occurs coincident with the switching of streams. The buffer flushing process continues each time an I-frame enters the FIFO until a decision to switch to this stream is made. If the I-frame has been immediately preceded by a sequence header, then the switching process continues using the PES and sequence headers within the PES packet. If the PES packet for the I-frame does not contain a sequence header, then the last stored sequence header is multiplexed into the stream. The resulting output stream contains a sequence header just prior to the I-frame.

At the switch point a minimum of two frames must reside within the FIFO memory. This condition permits a calculation of the temporal reference at the switch point. Optionally, a GOP header may be inserted prior to the output of the I-frame and the temporal reference of the I-frame is set to zero. Offsets from the incoming temporal references and the new values are calculated at the switch point.

Streams can essentially be left at any point with the consequence of the last frames in the currently-selected stream possibly being of incorrect display order. The visual effect will be masked by the natural shift to new video material. If the currently-selected stream is left just prior to an anchor frame, no frame reordering effect will be encountered. An additional number of frames, belonging to the currently-selected stream, reside in the decoder buffer at this time. The number of frames in the decoder buffer have been tracked by a frame byte counter in the PES retiming circuit 300V.

An MPEG picture header contains a VBV delay number indicative of the amount of time a decoder should wait (after the picture header enters the decoder's VBV buffer) before decoding the picture. The VBV delay, therefore, equates to the decode time stamp (DTS) minus the PCRB and relates to the number of frames in the decoder buffer. The VBV delay at any given instant is calculated using this equation at the output of the PES retiming circuit.

The incoming MPEG stream contains the VBV delay created when the stream was encoded or retimed. Both the next-selected stream and the currently-selected stream VBV delays are known at the time of switching. In general these values will not match. Since during video encoding it is desirable to place as many frames in the decoder buffer as possible, the VBV delay of the last frame in the currently-selected stream should be large. This creates an opportunity to match the VBV delay of the next-selected stream to the actual VBV delay in the decoder buffer.

The next-selected stream and currently-selected stream VBV delays are compared in the PES retiming circuit 300V at the time of switching. This initially indicates whether the decoder buffer contains too much or too little delay. When too little delay is in the decoder buffer to satisfy the incoming VBV delay value, data should be output at a maximum rate. This places more frames of delay in the decoder buffer. This process continues until the VBV delay in the decoder buffer (i.e., VBV delay calculated in the PES retiming circuit 300V) approximates the just-selected stream VBV delay. The number of frames in the input FIFO 220 is monitored during this process. If the FIFO 220 is nearing empty, a repeat frame is added to the stream from the repeat frame store. When too much delay is in the decoder buffer, output is stopped until the proper amount of delay is in the decoder buffer. If FIFO 220 is nearing overflow, a frame is dropped from the stream. When the VBV delays are aligned, output rate control switches to a second mode of operation.

The second mode of operation is controlled by the PES retiming circuit 300V. The number of frames in the input FIFO plus the number of frames in the decoder buffer when added together and multiplied by the frame period, produce the end to end delay of this system. The end to end delay of a system may also be defined as the amount of time required for any individual byte to travel from the input of the receive input FIFO to the output of the VBV buffer. This end to end delay value is stored for use in determining the remote source's clock timing difference from the local reference clock. The value is stored when the incoming VBV delay is aligned to the VBV delay in the decoder buffer. This end to end delay value is expected to remain constant when the remote and local clocks are at exactly the same rate. Alternately, the offset between the incoming PCR and the local PCR can be stored. This offset is expected to remain constant when the remote and local clocks are at exactly the same rate. The PES retiming circuit will extract frames from the FIFO based upon the frame rate embedded in the data stream. The decoder buffer contains the VBV delay currently in the stream.

The controller 230 monitors the FIFO 220 and determines if the FIFO 220 is filling (i.e., remote clock faster than station clock) or emptying (remote clock is slower than station clock). If the FIFO is tending to fill up then the controller may responsively cause the add/drop unit to drop one or more frames. If the FIFO is tending to empty then the controller may responsively cause the add/drop unit to add one or more frames. This filling up or emptying of the FIFO may occur in the second operating mode of the frame synchronizer, when the FIFO is briefly storing each frame of the input video stream S1V and the PES switcher 130 has selected the remote video and audio streams S2PV, S2PA for output.

Dropping frames is accomplished by choosing frames that can be safely removed from the stream without upsetting either the picture re-ordering scheme or the predicted picture quality. This may include dropping one or more frames to accomplish this end. Predicted picture quality is minimally affected when the anchor frame and all intervening B pictures before the next anchor frame are dropped. Any B picture may be deleted without affecting the quality of the other pictures in the stream.

Adding frames is accomplished by inserting a P or B-type frame comprising uncoded macroblocks with zero motion vectors. Such a frame will act as a "repeat last frame" command in an MPEG-compliant syntactical manner. The added frame can be either a P-frame or B-frame, though a P-frame is preferred because picture quality is best preserved when the added frame causes an I-frame to be repeated. The added "dummy" frame is stored in the controller or add/drop unit and inserted when necessary.

When the remote clock frequency is consistently higher than the local clock frequency, the end to end system delay will increase. When the remote clock frequency is consistently lower than the local clock frequency, the end to end system delay will decrease. When the current value differs from the stored value for end to end delay, by the value equal to one frame and other external criteria are met, a frame is either dropped or added as the case may be.

Controller 230 may be used to monitor the external criteria in the input PES stream S1V. Examples of external criteria which might be evaluated includes scene change indicia (e.g., a large number of intra-coded macroblocks), black field indicia, a minimal number motion, and the appropriate detection of anchor frames (i.e., I-frame followed by an I-frame or a P-frame). By utilizing the external criteria, frame adding and frame dropping maybe performed in a manner which minimizes the impact on, e.g., video and audio quality.

The operation of frame synchronizer 200 will now be discussed with respect to FIG. 4. For purposes of this discussion it is assumed that the video and audio streams S2PV, S2PA representing the remote feed SnN have been selected by the PES switcher 130. It is also assumed that the video PTS-DTS retiming unit is monitoring the selected video stream S2PV and responsively producing control signals.

Figure 4:
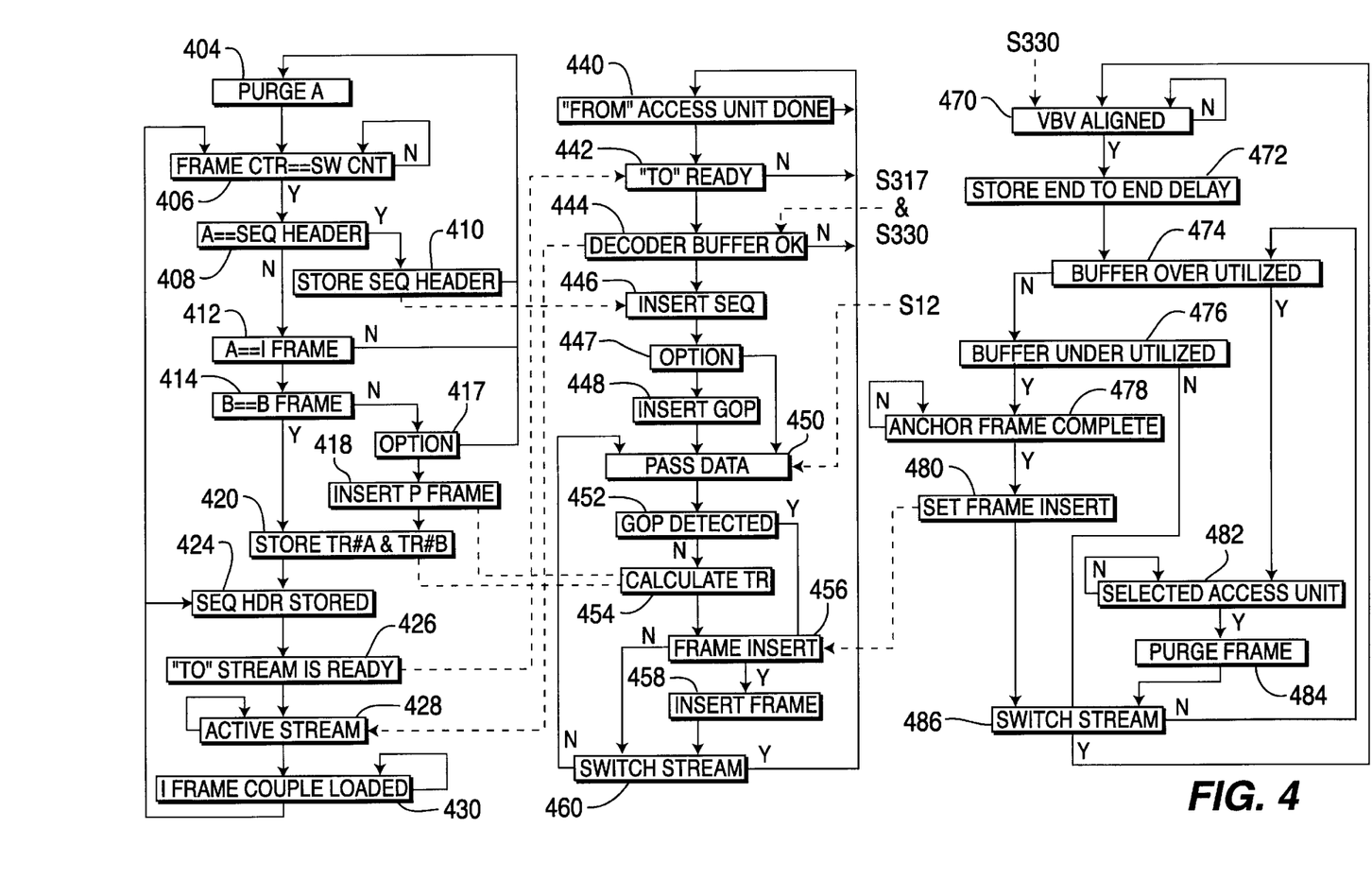
FIG. 4 shows a flowchart useful in understanding the frame synchronizer of FIG. 2.

FIG. 4 shows a flow chart useful in understanding the invention. As previously discussed with respect to the frame synchronizer 200 of FIG. 2, the input video signal S1V is coupled to a first-in first out memory 220. FIFO 220 is large enough to hold an I-frame and, ideally, all subsequent frames up to and including the next I-frame. In the following description an access unit "A" is the access unit at the output of FIFO 220. Access unit "B" is the next access unit, and so on. A frame counter may be implemented in, e.g., the controller 230. The frame counter simply counts the number of access units stored in FIFO 220.

The flow chart of FIG. 4 comprises three interrelated control routines, a frame alignment routine (steps 404–430), a switching routine (steps 440–460) and a frame add/drop routine (steps 470–486). The alignment routine (steps 404–430) aligns the video frames or access units in the input stream S1V prior to it's selection as the output stream S2PV. The switching routine (steps 440–460) ensures that a selection of resulting stream S2PV as an output occurs at the appropriate time with respect to the currently selected stream (e.g., S3PV). The frame add/drop routine (steps 470–486) is used to increase or decrease the number of frames in the combined input FIFO and the far-end decoder buffer. These routines are primarily under the control of the controller 230 depicted in FIG. 2. Portions of the routines rely on data received from other sources. For example, a VBV alignment process (step 470) occurs in, e.g., video PTS-DTS retiming unit 300V. A buffer flow control signal S12 indicative of the down stream buffer status is provided to the controller.

The alignment routine (steps 404–430) is entered at step 406. In the exemplary embodiment, there must be at least two access units (e.g., video frames) stored in the FIFO before the stream passing through the FIFO (S1V) may be coupled to an output (by, e.g., PES switcher 130). Moreover, the first access unit must be an I-frame. If the number of access units (CNT) stored in the FIFO 220 is below a threshold number (SW CNT) then the routine waits for additional access units to enter the FIFO. When the number of access units (Frame CTR) is equal to the threshold number (SW CNT at step 406) then the first access unit (i.e., access unit "A") is examined. If access unit "A" contains a sequence header then (step 408) the controller stores the sequence header (step 410) for later use by the stream switching routine (steps 440–460) and a "sequence header stored" flag is set. If access unit "A" is not an I-frame (step 412) then access unit "A" is purged from the FIFO (step 404), thereby advancing the remaining access units to the next "position" in the FIFO. Steps 406 through 412 are repeated until access unit "A" is an I-frame.

When access unit "A" becomes an I-frame, access unit "B" is then examined (step 414). If access unit "B" is a B-frame then a P-frame is optionally (step 417) inserted (step 418) between access unit "A" and access unit "B." If a P-frame is not optionally inserted (step 417) then access unit "A" is purged from the FIFO (step 404) and steps 406 through 412 are repeated until access unit "A" is an I-frame. The inserted frame may be, e.g., a P-frame comprising uncoded macroblocks with zero motion vectors. Such a frame will act as a "repeat last frame" command (i.e., repeat access unit "A" ).

Temporal reference values for access units "A" and "B" are also stored for use in calculating new temporal reference values (step 420).

If a sequence header has not been stored (step 410) then the entire alignment process (steps 406–422) must be repeated. This is because it is necessary for a sequence header to precede the I-frame stored in access unit "A" when the stream S1V is selected. The most recent sequence header is stored for insertion into the stream just prior to I-frames that are not immediately preceded by a sequence header. If a sequence header has been stored then the output stream S2PV is in condition to be selected by the switcher 130 (i.e., the next-selected or switching "TO" stream is ready, per step 426) and a "ready flag" is set.

If the input stream S1V is the active stream (i.e., the presently selected stream) then the routine will wait (step 428). If the input stream S1V is not the active stream (step 428) and an I-frame has not been loaded into the FIFO then the routine will wait. When the next I-frame and the following frame are received by the FIFO the contents of the FIFO will be flushed so that the received I-frame will be stored in the access unit "A" position. The entire alignment process (steps 406–430) will then be repeated.

The switching routine (steps 440–460) is entered at step 440. The switching process begins when the last complete access unit of the active stream (ideally the access unit just before an anchor frame in the "FROM" stream) has been sent (step 440), and the output stream S2PV (i.e., the "TO" stream) is ready to be selected (step 442), and a decoder buffer ready flag is set (step 444).

When the above conditions are met (steps 440–444) the controller 230 causes (step 446) the stored sequence header (from step 410) to be transmitted as the first output of video stream S2PV. In addition, a "sequence header stored" flag is reset and an "active stream identifier" flag is changed. The controller then optionally (step 447) causes (step 448) a group of pictures (GOP) header to be transmitted as the next output of video stream S2PV. The GOP header will be used to reset a temporal reference counter in, e.g., a far-end decoder. The controller then causes (step 450) the FIFO to transmit the first of the stored access units (i.e., access unit "A").

Temporal reference correction is required until a GOP Header is detected. If a GOP header is not detected (step 452) just prior to the aligned I-frame, then the temporal reference of the access unit being transmitted must be calculated (step 454).

The following operations are performed when a GOP is optionally inserted ahead of the I-frame. During alignment, when the received access unit "B" is an I-frame or P-frame, all temporal references must be decremented by the value in the received access unit "A" temporal reference. When the received access unit "B" is a B-frame (requiring a repeat P-frame insertion), first, access unit "A" temporal reference is set to zero. Second, the inserted P-frame temporal reference is set to one plus the temporal reference difference of access unit "A" minus access unit "B" . Third, the B-frame and successive frames' temporal references are calculated (step 454) by subtracting the "B" access unit temporal reference from the incoming temporal reference and adding one.

The following operations are performed when a GOP is not optionally inserted before the I-frame. When the received access unit "B" is an I-frame or P-frame, all temporal references must be decremented by the value in the received access unit "A" temporal reference, and then incremented by one plus the last anchor frame temporal reference value in the "From" stream. When the received access unit "B" is a B-frame, access unit "A" temporal reference is set to zero, and then incremented by one plus the last anchor frame temporal reference value in the "From" stream. Since access unit "B" is a B-frame, a repeat P-frame must be inserted. The inserted P-frame temporal reference is set to one plus the temporal reference difference of access unit "A" minus access unit "B," and then incremented by one plus the last anchor frame temporal reference value in the "From" stream. The B-frame and successive frames temporal references are calculated (step 454) by subtracting the "B" access unit temporal reference from the incoming temporal reference and adding one, and then incrementing by one plus the last anchor frame temporal reference value in the "From" stream.

If the frame insert flag has been set (step 456) then a frame comprising uncoded macroblocks with zero motion vectors is inserted (step 458) into the output stream S2PV. As previously discussed, such a frame will act as a "repeat last frame" command.

If a "switch stream" command (step 460) has not been issued (i.e., a command to switch back to the originally selected buffer) steps 450–460 are then repeated. In this manner the input stream S1V is coupled through the FIFO 220 and the frame add/drop unit 240 to produce output video stream S2PV.

The frame add/drop routine (steps 470–486) is entered at step 470. Video PTS-DTS retiming unit 300V aligns the VBV delays as follows. At initialization the VBV buffer is empty. As the first frames are output to the VBV buffer, a running total of the bytes in the VBV buffer is maintained by a frame byte counter 354. If this total equals the VBV buffer size, an output signal S317 from the frame byte counter 354 to the logic unit 325 causes the logic unit 325 to prevent data from being output from the PTS-DTS retiming unit 300V.

Two modes of VBV buffer operation are possible as described in Annex C of the MPEG2 specification. The first mode (Mode A) requires VBV delay to be set to hexadecimal FFFF. The second mode (Mode B) requires the VBV delay to not be set to hexadecimal FFFF, but instead reflect the true value of VBV delay in the VBV buffer.

During Mode A initialization, bytes are output to the VBV buffer until the buffer is full as indicated by frame byte counter 354. Once the VBV buffer is full, data is extracted from the VBV buffer as described in Annex C of the MPEG2 specification.

During Mode B initialization, bytes are output to the VBV buffer until the calculated value of VBV delay is greater than or equal to the VBV delay value in the incoming stream S4P. The incoming stream should be self consistent and MPEG2 compliant in that the buffer will not over/under flow using the values contained in the stream. The calculated value of VBV buffer fullness contained in frame byte counter 354 is used to prevent under/over flow of the VBV buffer. Data flow to the VBV buffer can be regulated using this calculated value if the incoming stream for some reason is not consistent. The DTS-PTS values in the stream should be consistent with the VBV delay values contained in the stream.

When switching to a stream in Mode A, the hexadecimal FFFF value of VBV delay in the "To" stream is overwritten with the calculated value maintained in the PTS-DTS retiming section. When switching to a stream in Mode B, the hexadecimal value of VBV delay in the "To" stream is overwritten, when necessary, with the calculated value maintained in the PTS-DTS retiming section 300V until the calculated VBV buffer value and the "To" stream VBV delay value are aligned. Otherwise the incoming stream data flow is held until the VBV delays align. This process takes advantage of the re-multiplexing operation that is occurring in the Transport Stream Encoder that follows the retiming circuit. During the alignment period, data may be output to the VBV buffer at maximum video bit rate, to increase the VBV delay in the VBV buffer. This process can continue until the VBV delays align as long as the buffer does not become full.

After VBV delay alignment, the number of frames in the input FIFO plus the number of frames in the decoder buffer when added together and multiplied by the frame period, produce the end to end delay of this system. This number of frames is stored (step 472). Since the end to end delay of the system is fixed, the proper utilization of the FIFO 220 is related to the proper utilization of an input buffer at a far-end decoder.

Under steady state conditions, the FIFO is receiving the input data stream S1V and transmitting the FIFO output stream S3V. If the data rate of the received stream (S1V) exceeds (step 474) the data rate of the transmitted stream (S3V) the FIFO will start to fill up. This filling, or over-utilization of the FIFO may result in an undesirable overflow condition that tends to increase the end to end delay. Similarly, if the data rate of the transmitted stream (S3V) exceeds (step 476) the data rate of the received stream (S1V) the FIFO will start to empty. This emptying, or under-utilization of the FIFO may result in an undesirable under-flow condition that tends to decrease the end to end delay. To address the over-utilization condition a drop frame operation (steps 482 and 484) is performed. To address the under-utilization condition, an insert frame flag may be set (step 480), thereby instructing the switching routine to insert a frame at step 458. The data increase/decrease provided by the inserted/deleted frame maintains frame synchronization between the remote input SUN and the resultant transport stream S11.

The FIFO utilization is monitored and corrected as follows. If the FIFO memory is over-utilized and all external criteria for dropping a frame are satisfied, then the frame at the output of the FIFO (i.e., access unit "A" ) is examined until the frame meets the drop frame criteria (step 482). When access unit "A" meets this criteria then access unit "A" is purged by shifting all the access units forward in the FIFO without transmitting access unit "A" (i.e., access unit "A" is discarded, access unit "B" becomes access unit "A" and so on). In addition, the temporal references of affected frames are modified. This is the frame drop mode.

If the FIFO memory is under-utilized and all external criteria for adding a frame are satisfied (step 478), then the frame insert flag is set. The switching routine will then insert a repeat frame at step 456. In addition, the temporal references of affected frames are modified. This is the frame add mode. If the FIFO memory utilization is within the appropriate range (i.e., less than over-utilization and greater than under-utilization) then no frames are added or dropped. This is the pass-through mode.

If the selected stream has been switched again (step 486) then a non-steady state condition (i.e., transitional state) exists and the VBV buffers will need to be realigned and the frame add/drop routine will be reentered at step 470.

Figure 3:
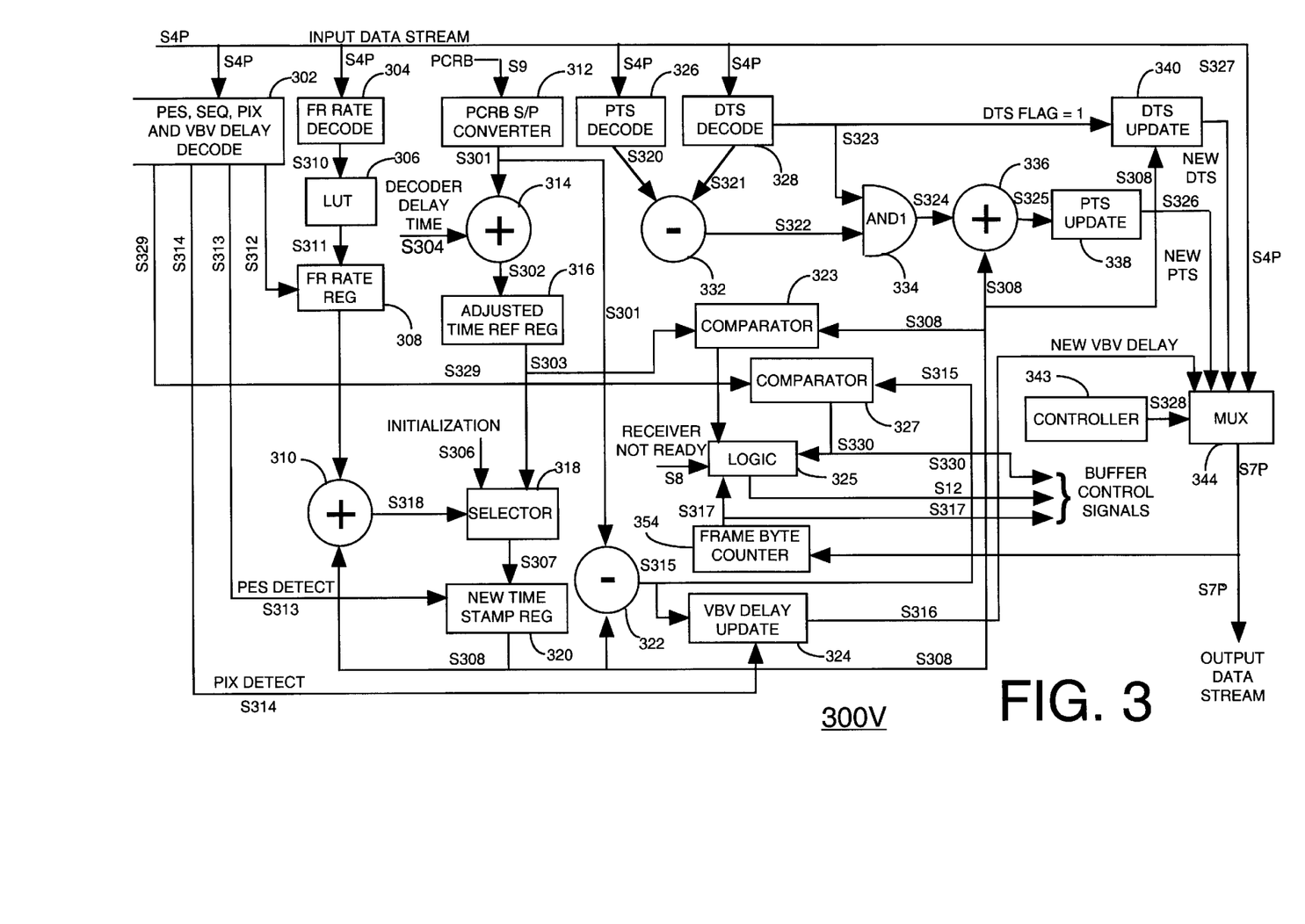
FIG. 3 shows a block diagram of a video PTS-DTS retiming system suitable for use in the information processing system of FIG. 1.

FIG. 3 shows a block diagram of a video PTS-DTS retiming system suitable for use in the information processing system of FIG. 1. The PTS-DTS retiming unit 300V receives a PES input bitstream S4P from a PES switcher 130 and delivers a PES output bitstream S7P to a TSE 150. The TSE will do the PCR stamping at its output. The TSE feeds back a synchronized PCR base reference (S9) at a 90 KHz rate (the station clock of 27 MHz divided by 300). The PTS-DTS retiming unit operates as follows.

PCRB serial to parallel converter 312 converts the PCRB signal S9 from TSE 150 into a parallel (byte) stream S301 which is coupled to an adder 314 and a subtractor 322. Adder 314 adds the parallel PCRB S301 to a decoder delay time S304 to produce an adjusted PCRB time reference S302 which is stored in an adjusted time reference register 316. The adjusted PCRB time reference S302 reflects the value of the PCRB count when a first picture may be removed from the video buffer and decoded at the far-end decoder.

At a turn-on initialization time, an initialization command S306 causes a selector 318 to transfer the stored time reference S303 into a new time stamp register 320. Each time a PES header is decoded in the input bit stream S4P, an offset number, stored in the frame rate (FR) register 308, is added to the new time stamp S308 by an adder 310. The result of this addition is returned to the new time stamp register 320 via selector 318.

The adder 310 offset number is specifically the number of cycles of 90 KHz contained in one frame time of the prevailing frame rate. The adder 310 offst numbers are shown in Table 1 (third column), and are automatically set as follows. A PES, sequence, pix and VBV delay decoder 302 detects a sequence start code in the input data stream S4P and produces a sequence detect signal S312. A frame rate decoder 304 extracts the four-bit Frame Rate Code S310 (first column of Table 1). The binary value of the frame rate code S310 corresponds to the frame rates listed in the second column of Table 1, as pre the ATSC specification. A Look-Up-Table (LUT) 306 provides the offset number S311 (third column of Table 1) to frame rate register 308. In response to sequence detect signal S312, frame rate register 308 provides the stored offset number to adder 310. It should be noted that since PES streams can have a plurality of sequences of intermixed frame rates, the PTS-DTS retiming unit of the invention automatically calculates all of the time stamp updates.

TABLE 1

| FRAME RATE CODE IN SEQUENCE HEADER | FRAME RATE VALUE (Hz) | ADDER 310 OFFSET NUMBER |
|---|---|---|
| 0001 | 24/1.001 (23.967 . . .) | 3753.75 |
| 0010 | 24 | 3750 |
| 0011 | 25 | 3600 |

TABLE 1-continued

| FRAME RATE CODE IN SEQUENCE HEADER | FRAME RATE VALUE (Hz) | ADDER 310 OFFSET NUMBER |
|---|---|---|
| 0100 | 30/1.001 (29.97 . . .) | 3003 |
| 0101 | 30 | 3000 |
| 0110 | 50 | 1800 |
| 0111 | 60/1.001 (59.94 . . .) | 1501.5 |
| 1000 | 60 | 1500 |

The next step is to calculate the new PTS and DTS. DTS decode unit 328 decodes the DTS, if present, in the input data stream S4P to produce a DTS signal S321. DTS decode unit 328 also provides an indication flag S323 which is high (binary 1) if the input data stream S4P includes a DTS, and low (binary 0) if there is only a PTS (i.e., B-Frame operation). The DTS indication signal S323 is coupled to AND unit 334 and DTS update unit 340. The new DTS S327 is taken from the new time stamp register 320 only if the DTS flag S323 indicates the presence of a DTS in the input data stream S4P.

PTS decode unit 326 decodes the PTS in the input data stream S4P to produce a PTS signal S320. The difference S322 between the existing PTS S320 and DTS S321 is provided by subtractor 332 to AND unit 334. The new PTS S326 is calculated by adding the subtractor 332 output number S322 to the number S308 stored in the new time stamp register 320. This operation takes place in adder 336. Notice that when there is no DTS present (i.e., DTS Flag=0), then the input S324 to adder 336 from AND unit 334 is zero (because of the operation of the AND unit 334) and new PTS S326 is the number S308 stored in the new time stamp register 320.

The new PTS S326 and the new DTS S327 are stored in respective update registers 338,340. A multiplex unit 344 inserts the new PTS S326 and DTS S327 values into the output data stream S7P in place of the old values. A controller 343 tracks the location of the appropriate bits in the outgoing data stream S7P, and causes the multiplex unit 344 to insert the updates in the correct positions in the stream. The outgoing data stream S7P proceeds to the transport stream encoder 150 in the usual manner.

The PTS-DTS retiming unit 300V also provides the ability to manage end-to-end delay in the system by accounting for buffer behavior in a far-end decoder (e.g., a set-top receiver) and buffer or bitstream generation behavior in the bitstream sources (e.g., frame synchronizer 200 or PES source 140), as will now be described.

PES, sequence, pix and VBV delay decoder 302 detects the start of a PES packet in the input data stream S4P and produces a PES detect signal S313 which is coupled to the new time stamp register 320. At each PES interval, the new time stamp register 320 is updated with a fixed constant S318 which is determined by the prevailing frame rate. The updated contents S308 of the new time stamp register 320 are compared with the contents S303 of the adjusted time reference register 316 by a comparator 323. The comparator result (i.e., less than, greater than, or equal to) provides an indication of the rate at which the PES data is being processed (i.e., too slowly, too quickly, or just right). If the PES stream S4P is being issued too slowly by, e.g., the PES source 140, the output buffer (not shown) of the PES source 140 may be read or emptied at a maximum rate. If the comparison indicates that processing is proceeding too quickly, the reading of the buffers in the encoders or servers can be halted or reduced. A buffer flow control signal S12 is coupled to frame synchronizer 200 and PES source 140 for controlling the bitrate of the respective output streams.

Additionally, there is ordinarily a buffer (not shown) at the input to the TSE 150. If the TSE buffer is receiving data at too high a rate the TSE may supply a RECEIVER NOT READY signal S8 to the PTS-DTS retiming unit 300. The RECEIVER NOT READY signal S8 is coupled to a logic unit 325 at the output of comparator 323. The logic unit responsively generates a buffer flow control signal S12 which halts or reduces the bitrate generation of the encoders 210,220.

The PTS-DTS retiming unit of FIG. 3 has the ability to calculate the VBV delay number S316 and insert it (via multiplexer 344) into the 16 bit field within the Picture Header. The output of the PCRB serial to parallel converter 312 (i.e., the current time) is subtracted from the contents of the new time stamp register 320 in subtractor 322. PES, sequence, pix and VBV delay decoder 302 detects a picture header in the input data stream S4P and produces a pix detect signal S314 which is coupled to the VBV delay update register 324. In response to the pix detect signal S314, the VBV delay update register 324 stores the output S315 of subtractor 322. This stored number S316 represents the time, in 90 KHz cycles, that the picture will reside in the far-end decoder buffer, namely, the VBV delay parameter. Thus, the invention creates an ATSC compliant bitstream without using the ATSC mode in which the VBV delay fields are set to hexadecimal FFFF.

Temporal reference in the Picture Header must also be adjusted to reflect the appropriate display order of the pictures in a group of pictures (GOP) as specified by the ATSC standard. When the input data stream S4P switches to a sequence header followed by a GOP Header, the temporal reference will be properly set to start at zero in the currently selected stream so that no adjustment is needed as the selected stream switches to another stream. However, if the GOP Header does not follow a sequence header then the new temporal reference value must be properly updated in the newly selected stream. The new temporal reference can be determined by monitoring the previously selected stream (i.e. the "From" stream). New succeeding temporal reference values can be determined by monitoring the original value relationships on a frame by frame basis and updating the new temporal reference value with values that refer to the temporal reference value at the time the streams were switched. This technique will achieve the result of maintaining the display ordering of the temporal reference, even though the pictures are in transmission order.

VBV buffer fullness must also be monitored to properly control the flow of the video stream to the decoder. At initialization (i.e., initialization command S306 asserted), the number of bytes output from the PTS-DTS retiming unit 300V are stored on a frame by frame basis. The current time, decode time for each frame, the number of bytes per frame, and the VBV buffer size are used to determine the fullness of the VBV buffer.

At initialization the VBV buffer is empty. As the first frames are output to the VBV buffer, a running total of the bytes in the VBV buffer is maintained by a frame byte counter 354. If this total equals the VBV buffer size an output signal S317 from the frame byte counter 354 to the logic unit 325 causes the logic unit 325 to prevent data form being output from the PTS-DTS retiming unit. If the VBV buffer is not full, data is output until the calculated VBV buffer delay is greater than or equal to the VBV delay in the received stream (S4P).

In steady state operation, after the first period of end-to-end delay has occurred, a frame of data is removed from the VBV buffer when the current time matches the decode time stamp. The number of bytes in that frame are subtracted from the running total kept in the frame byte counter of the PTS-DTS retiming unit 300V. If the VBV buffer had been full, space has now been made for more data to be sent. If all of the end-to-end delay data had been in the VBV buffer, the frame exiting the VBV buffer at the decode time initiates the sending of the next frame.

The above-described VBV delay processing function operates by calculating a new VBV delay number and overwriting the VBV delay number present in the input stream S4P. This method provides control of the VBV delay number on a frame by frame basis and is usually quite adequate to ensure MPEG compliance of the output stream S7P. A second (optional) VBV delay processing function may be implemented to provide finer control, thus allowing a smoother transition between the presently-selected stream and the next-selected stream.

The optional second VBV delay processing function may be incorporated into the PTS-DTS retiming unit 300 as follows. PES, sequence, pix and VBV delay decoder 302 detects the VBV delay parameter included within the PES picture header of input data stream S4P. The detected VBV delay S329 is coupled to a second comparator 327 and compared to the updated VBV delay number S315 produced by subtractor 322. The result of this comparison S330 represents the relative equality of the two VBV delays and is output for use in frame synchronization and coupled to logic unit 325, where an additional calculation of decoder buffer utilization is performed. The additional calculation notes the size of the difference between the two VBV delays and, in response, acts in conjunction with the output of comparator 323 to generate the buffer flow control signal S12 for regulating data production in the video/audio encoders (for live bitstreams) or the servers (for stored bitstreams).

It must be noted that the VBV delay number present in the input stream was initially calculated by an encoder (not shown) to maintain the end to end delay of the system as controlled by the buffer at the decoder. By measuring the displacement of the VBV delay being produced by subtractor 322 and the VBV delay used in the presently selected stream S4P, the logic unit 325 can modulate buffer flow control signal S12 more precisely. The buffer flow control signal S12, as previously discussed, may be used to speed up or slow down the data rate of a bitstream source.

The invention has been described within the context of a video frame synchronizer which is operative upon an MPEG information stream within an information processing system. It will be appreciated by those skilled in the art that the invention may be also implemented by programming a general purpose computer receiving and processing one or more information streams. Such a general purpose computer becomes a specific purpose computer when programmed according to the invention. For example, the FIFO 220 of FIG. 2 may be an addressable memory which is accessed using, e.g., memory pointers. Frames may be dropped by skipping (i.e., pointing past) one or more memory locations representing one or more access units. Frames may be added by pointing to additional memory locations representing one or more access units. The memory locations may be also arranged as a so-called "linked list," wherein each memory location or frame includes a pointer to the next location or frame. By modifying the pointers memory locations or frames may be selectively skipped or included in an output stream.

It must also be noted that the embodiment of the invention described herein may be modified for use in other compressed data systems where, e.g., an asynchronous compressed information stream including segmented data must be synchronized to a timing reference. Such a compressed data system may include wired or wireless telecom or other information processing systems.

The frame synchronizer 200 of FIG. 2 and the above-described methods are useful in frame-rate conversion applications. That is, the frame add/drop method allows the frame synchronizer and the PTS-DTS retiming system 300 of FIG. 3 to become an effective frame rate converter. For example, a 60 frames per second (fps) progressive scan stream can be converted to a 59.94 fps progressive scan stream, and vice versa. Similarly, a 30 fps interlaced scan stream can be converted to a 29.97 fps interlaced scan stream, and vice versa. In the case of converting a 60 fps progressive scan input stream to a 59.94 fps progressive scan output stream, or a 30 fps interlaced scan input stream to a 29.97 fps interlaced output stream, the Frame Rate Code in the sequence header of the output stream must be appropriately changed. This will insure proper time stamping of other relationships, such as the PTS and DTS. Since the output frame rate is less than the input frame rate, the number of frames in the FIFO will increase to the point that a frame must be dropped, following the frame drop and frame temporal re-ordering rules previously established.

In the case of converting a 59.94 fps progressive scan input stream to a 60 fps progressive scan output stream, or a 29.94 fps interlaced scan input stream to a 30 fps interlaced output stream, the Frame Rate Code in the sequence header of the output stream must be appropriately changed as before. Since the output frame rate is greater than the input frame rate, the number of frames in the FIFO will decrease to the point that a frame must be added, using the frame repeat and the frame temporal re-ordering rules previously established.

The frame rate conversion can be applied to convert a continuous input stream to a similar scan type output stream as just described. Therefore, the frame synchronizer 200 can switch between a "from" stream and a "to" stream by following the above-described rules associated with in and out points, and by using the previously discussed add/drop methods. The output stream must follow the scan type of the selected input stream in the case of dissimilar scan types. It is also follows that the "to" stream can remain at the original frame rate, or change to the frame rate of the "from" stream (i.e., act as both a frame rate converter and a switcher) in all cases of "to" and "from" streams of similar scan types.

Although various embodiments which incorporate the teachings of the present invention have been shown and described in detail herein, those skilled in the art can readily devise many other varied embodiments that still incorporate these teachings.

What is claimed is:

1. Apparatus for processing a compressed information stream to produce an output information stream, said compressed information stream representing a sequence of compressed information frames that have been encoded according to a first timing reference, said apparatus comprising:

an input buffer, coupled to a controller, for receiving said compressed information stream and providing a buffered information stream; and a frame sequence adjuster, coupled to said controller, for selectively adding and deleting information frames from said buffered information stream to produce said output information stream;

said controller, in response to an indicia of input buffer utilization exceeding a first threshold level, causing said input buffer to delete at least one information frame from said output information stream;

said controller, in response to a calculated utilization level of a buffer suitable for receiving said output stream exceeding a second threshold level, causing said frame sequence adjuster to delete at least one information frame from said output information stream;

said controller, in response to said calculated utilization level of a buffer suitable for receiving said output stream being below a third threshold level, causing said frame sequence adjuster to add at least one information frame to said output information stream.

2. The apparatus of claim 1, wherein:

said indicia of input buffer utilization comprises indicium of a difference in flow rate of said output information stream and said compressed information stream.

3. The apparatus of claim 1, wherein:

said frame sequence adjuster comprises storage means for storing at least a portion of said buffered information stream; and said indicia of input buffer utilization comprises indicium of a difference in flow rate of said output information stream and said compressed information stream.

4. The apparatus of claim 3 wherein:

said frame sequence adjuster deletes an information frame by removing said frame to be deleted from said storage means; and said frame sequence adjuster adds an information frame by repeated an information frame.

5. The apparatus of claim 1, wherein:

said controller, in a nonselected mode of operation, comparing said calculated utilization level of said buffer receiving said output stream to a calculated utilization level of said buffer receiving a presently selected information stream; and said controller, in a selected mode of operation, causing said output information stream to be provided to said buffer in place of said presently selected information stream, said controller entering said selected mode of operation when said calculated utilization levels are substantially equal.

6. The apparatus of claim 5, wherein said controller, in a nonselected mode of operation, causes said frame sequence adjuster to store said compressed information stream such that an information frame of a first predetermined type will be coupled to an output upon entering a selected mode of operation.

7. The apparatus of claim 1, wherein said controller, in a nonselected mode of operation, causes said frame sequence adjuster to store said compressed information stream such that an information frame of a first predetermined type will be coupled to an output upon entering a selected mode of operation.

8. The apparatus of claim 1, wherein said utilization level of a buffer receiving said output stream is calculated using presentation time stamp (PTS), decode time stamp (DTS) and program clock reference (PCR) information included within said compressed information stream.

9. The apparatus of claim 1, wherein said utilization level of a buffer receiving said output stream comprises a video buffer verifier (VBV) calculation.

10. A method of processing at least one compressed image stream to produce a compressed output information stream, each compressed information stream representing a respective sequence of compressed image frames, said output information stream being processed in a manner tending to avoid decoder buffer underflow and overflow conditions, said method comprising the steps of:

receiving, via an input buffer, a first compressed information stream and providing a buffered information stream therefrom, said buffered information stream being further processed by a frame sequence adjuster to form a processed information stream;

deleting, from said input buffer, at least one information frame in response to an input buffer utilization level exceeding a first threshold level;

calculating a utilization level of a decoder buffer receiving said buffered information stream to provide a first calculated utilization level;

deleting, using said frame sequence adjuster, at least one information frame from said buffered information stream in response to said calculated utilization level exceeding a second threshold level; and adding, using said frame sequence adjuster, at least one information frame to said buffered information stream in response to said calculated utilization level being below a third threshold level.

11. The method of claim 10, further comprising the steps of:

calculating a utilization level of a decoder buffer receiving a second compressed image stream to provide a second calculated utilization level, said second compressed information stream being presently selected for transport encoding;

comparing said first and second calculated utilization levels; and selecting said processed information stream for transport encoding when said first and second calculated utilization levels are substantially equal.

12. The method of claim 11, further comprising the steps of:

deleting, using said frame sequence adjuster, at least one information frame from said buffered information stream in response to said first calculated utilization level being larger than said second calculated utilization level; and adding, using said frame sequence adjuster, at least one information frame to said buffered information stream in response to said first calculated utilization level being smaller than said second calculated utilization level.

13. The method of claim 10, wherein said first calculated decoder utilization levels comprises video buffer verifier (VBV) level.

14. The method of claim 13, wherein said VBV level is calculated using time stamp information within said processed information stream.

15. The method of claim 14, wherein said time stamp information comprises at least one of a presentation time stamp (PTS), a decode time stamp (DTS) and a program clock reference (PCR).

16. The method of claim 10, wherein said input buffer utilization level indicates a difference between a timing reference used to encode said first compressed information stream and a timing reference used to process said buffered and processed information streams.

17. The method of claim 10 wherein said information frames represent MPEG video access units.

18. The method of claim 17 wherein said deleted information frames comprise B-frames.

* * * * *